US008120602B2

(12) United States Patent
Kwon et al.

(10) Patent No.: US 8,120,602 B2
(45) Date of Patent: Feb. 21, 2012

(54) FLAT PANEL DISPLAY WITH CLOCK BEING GENERATED INSIDER THE DATA DRIVER USING XOR LOGIC WITH THE DATA SIGNAL AND A SECOND SIGNAL GENERATED FROM THE DATA SIGNAL USING A ENCODING SCHEME AS THE TWO INPUTS THAT ARE TRANSMITTED TO A CLOCK GENERATOR INSIDE THE DATA DRIVER

(75) Inventors: Ok Hwan Kwon, Gumi-si (KR); Jong Ki Kim, Gumi-si (KR); Jun Bae Park, Gumi-si (KR)

(73) Assignee: LG Electronics Inc., Seoul (KR)

( * ) Notice: Subject to any disclaimer, the term of this patent is extended or adjusted under 35 U.S.C. 154(b) by 936 days.

(21) Appl. No.: 12/130,293

(22) Filed: May 30, 2008

(65) Prior Publication Data

US 2008/0297445 A1 Dec. 4, 2008

(30) Foreign Application Priority Data

May 31, 2007 (KR) ........................ 10-2007-0053341

(51) Int. Cl.
*G06F 3/038* (2006.01)
*G06F 5/00* (2006.01)

(52) U.S. Cl. ............................. 345/211; 345/98; 345/37

(58) Field of Classification Search .................... 345/30, 345/60, 211–213, 98–100
See application file for complete search history.

(56) References Cited

U.S. PATENT DOCUMENTS

| | | | | |
|---|---|---|---|---|
| 6,198,674 | B1 * | 3/2001 | Kim | 365/193 |
| 6,744,280 | B2 * | 6/2004 | Morgan et al. | 326/86 |
| 6,897,842 | B2 * | 5/2005 | Gu | 345/90 |
| 2001/0024179 | A1 * | 9/2001 | Nakamura | 345/60 |
| 2002/0008682 | A1 | 1/2002 | Park | 345/87 |
| 2006/0041613 | A1 * | 2/2006 | Fackelmayer et al. | 709/203 |

FOREIGN PATENT DOCUMENTS

| | | | |
|---|---|---|---|
| EP | 1 699 038 | A1 | 9/2006 |
| WO | WO 2007/013718 | A1 | 2/2007 |

OTHER PUBLICATIONS

Forster, R. ("Manchester encoding: opposing definitions resolved," Engineering Science and Education Journal, vol. 9, No. 6, pp. 278-280, Dec. 2000).*
Crisp, J. ("Introduction to digital systems," pp. 49-50, 2000).*
European Search Reported dated Jan. 29, 2010 in Application No. 08 157 366.9.

* cited by examiner

*Primary Examiner* — Bipin Shalwala
*Assistant Examiner* — Hang Lin
(74) *Attorney, Agent, or Firm* — KED & Associates, LLP

(57) ABSTRACT

The plasma display panel device according to the present invention includes a the data driver that includes
a data IC applying a driving signal to at least one address electrode and a data driver applying a driving data signal to the data IC to reduce EMI and ensure timing margin according to high rate switching operations of the plural switches included in the data IC, wherein the data driver generates a first synchronization signal if N−1th data is different from Nth data and maintains and applies the first synchronization signal to the data IC if the Nth data is different from N+1th data.

13 Claims, 9 Drawing Sheets

| previous data | | current data | |
|---|---|---|---|
| data | middle signal value | data | middle signal value |
| 0 | 0 | 0 | 1 |
| 0 | 1 | 0 | 0 |
| 1 | 0 | 1 | 1 |
| 1 | 1 | 1 | 0 |
| 0 | 0 | 1 | 0 |
| 0 | 1 | 1 | 1 |
| 1 | 0 | 0 | 0 |
| 1 | 1 | 0 | 1 |

FLAT PANEL DISPLAY WITH CLOCK BEING GENERATED INSIDER THE DATA DRIVER USING XOR LOGIC WITH THE DATA SIGNAL AND A SECOND SIGNAL GENERATED FROM THE DATA SIGNAL USING A ENCODING SCHEME AS THE TWO INPUTS THAT ARE TRANSMITTED TO A CLOCK GENERATOR INSIDE THE DATA DRIVER

This application claims the benefit of Korean Patent Application No. 10-2007-0053341 filed on May 31, 2007, which is hereby incorporated by reference

BACKGROUND OF THE INVENTION

1. Field of the Invention

The present invention is directed to a flat display device and more specifically to a device supplying a data signal to a flat display panel.

2. Description of the Conventional Art

In recent years, high-resolution flat panel display devices have been developed, such as plasma display panel ("PDP") devices and liquid crystal display ("LCD") devices.

Out of the flat panel display devices, PDP devices have some advantages such as slim and large size, simplified structure, easy-to-manufacture characteristics, as well as raised brightness and emission efficiency.

A conventional PDP device has a data integrated circuit ("IC") that applies a driving signal to a plasma display panel.

The data IC generates a driving signal by switching operations of plural switches included in the data IC based on driving data.

In such a conventional PDP device, however, the number of discharge cells and driving data applied to the data IC increased to improve the image quality, and this caused the switches to perform a high-speed switching operation, which in turn generated considerable heat in the data IC.

SUMMARY OF THE INVENTION

An aspect of the present invention provides a flat panel display device that is capable of reducing EMI occurring in a driving circuit and ensuring a sufficient timing margin that can be reduced according to high rate switching operations of the driving circuit in supplying a data signal to a flat panel display panel such as a plasma display panel.

A flat panel display device according to an exemplary embodiment of the present invention includes a controller processing an inputted image signal to generate a data signal to be supplied to the panel, generating a first signal having information on whether two or more consecutive data of the data signal comply with each other and outputting the first signal along with the data signal; and a data driver generating a clock signal using the data signal and the first signal inputted from the controller and supplying the data signal to the panel using the generated clock signal.

BRIEF DESCRIPTION OF THE DRAWING

The accompany drawings, which are comprised to provide a further understanding of the invention and are incorporated on and constitute a part of this specification illustrate embodiments of the invention and together with the description serve to explain the principles of the invention.

DETAILED DESCRIPTION OF THE PREFERRED EMBODIMENT

Hereinafter, exemplary embodiments of the present invention will be described in more detail with reference to accompanying drawings. Although an exemplary PDP device is exemplified as a flat panel display device according to an exemplary embodiment of the present invention, the present invention is not limited to such a PDP device, and for example, the present invention may apply to the other flat panel display devices, such as LCD devices, OLED (Organic Light Emitting Diode) devices, etc.

Figure 1:
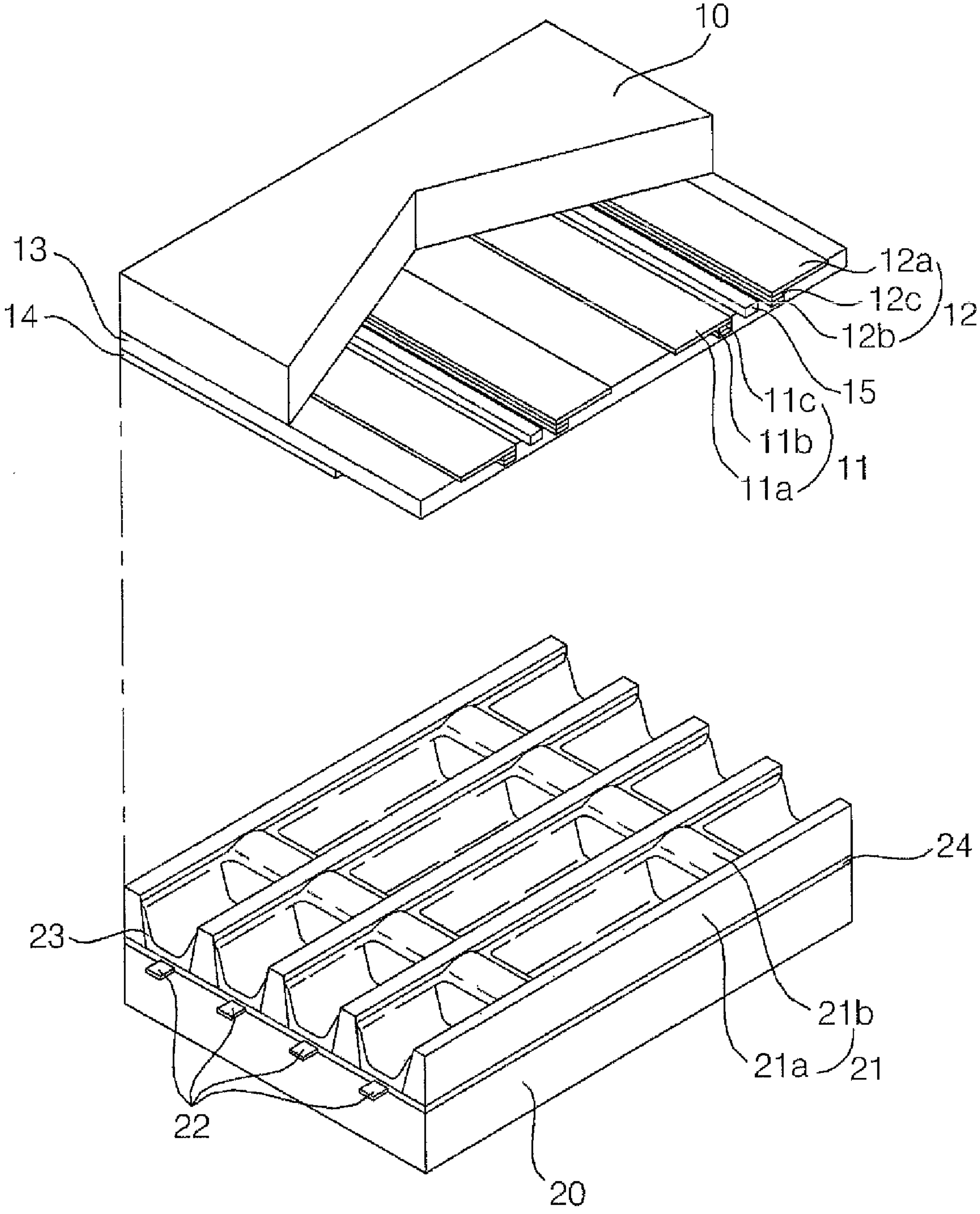
FIG. 1 is a perspective view illustrating a construction of a plasma display panel according to an exemplary embodiment of the present invention.

FIG. 1 is a perspective view illustrating a construction of a plasma display panel according to an exemplary embodiment of the present invention.

Referring to FIG. 1, a PDP includes a pair of sustaining electrode formed on an upper substrate 10 and an address electrode formed on a lower substrate 20. The pair of sustaining electrode includes a scan electrode 11 and a sustain electrode 12.

The scan electrode 11 includes a transparent electrode **11*a* generally made of indium tin oxide (ITO) and a bus electrode 11*b*. The sustain electrode 12 includes a transparent electrode 12*a* generally made of indium tin oxide (ITO) and a bus electrode 12*b*. The bus electrodes 11*b* and 12*b* may be formed in a single layer of a metal such as Ag and Cr, or in a multiple layer of Cr/Cu/Cr or Cr/Al/Cr. The bus electrodes 11*b* and 12*b* are stacked on the transparent electrodes 11*a* and 12*a*, respectively, and serve to reduce voltage drop due to high-resistance transparent electrodes 11*a* and 12*a***.

On the other hand, the pair of sustaining electrodes 11 and 12 may be formed of the bus electrodes **11*b* and 12*b* without the transparent electrodes 11*a* and 12*a*, as well as in the stacked structure of the transparent electrodes 11*a* and 12*a* and the bus electrodes 11*b* and 12*b*. This structure help reduce the manufacturing costs of the PDP. The bus electrodes 11*b* and 12*b*** may be made of various materials as well as the above-listed materials.

A black matrix (BM) 15 is positioned between the transparent electrode 11*a* and the bus electrode 11*b* and between the transparent electrode 12*a* and the bus electrode 12*b*. The black matrix 15 serves to absorb external light to reduce the reflection of light and improve purity and contrast ratio of the upper substrate 10.

In accordance with an exemplary embodiment of the present invention, the black matrix 15 is formed on the upper substrate. The black matrix 15 may include a first black matrix 15 and second black matrix 11*c* and 12*c*. The first black matrix 15 is formed to overlap a barrier rib 21. The second black matrix 11*c* is formed between the transparent electrode 11*a* and the bus electrode 11*b*, and the second black matrix 12*c* is formed between the transparent electrode 12*a* and the bus electrode 12*b*.

The first black matrix 15 and the second black matrixes 11*c* and 12*c*, which are called "black layer" or "black electrode layer", are simultaneously formed and physically connected to each other, or non-simultaneously formed and physically separated from each other.

In a case where the first black matrix and the second black matrixes are physically connected to each other, they may be made of the same material, but otherwise, they may be made of different materials.

An upper dielectric layer 13 and a protection layer 14 are stacked on the upper substrate 10 on which the scan electrode 11 and the sustain electrode 12 have been arranged in parallel to each other. The upper dielectric layer 13 on which electric charges generated by discharge are accumulated may function to protect the pair of sustaining electrodes 11 and 12. The protection layer 14 protects the upper dielectric layer 13 from sputtering caused by the electric charges generated during gas discharge and raise discharge efficiency of secondary electrons.

An address electrode 22 is formed in a direction of intersecting the scan electrode 11 and the sustain electrode 12. A lower dielectric layer 23 and the barrier rib 21 are formed on the lower substrate 20 on which the address electrode 22 has been arranged.

A phosphor layer 23 is formed on the surface of the lower dielectric layer 24 and the barrier rib 21. The barrier rib 21 includes a vertical barrier rib 21*a* and a horizontal barrier rib 21*b* crossing the vertical barrier rib 21*a*. The barrier rib 21 physically separates a discharge cell from other discharge cells, and prevents the leakage to neighboring discharge cells of ultraviolet rays and visible light generated by discharge.

Various types of barrier ribs may be available besides the barrier rib 21 shown in FIG. 1 according to an exemplary embodiment of the present invention.

The barrier rib 21 may have various structures other than the structure illustrated in FIG. 1. For example, the barrier rib 21 may be configured so that the vertical barrier rib 21*a* is different in height from the horizontal barrier rib 21*b*—this is called "height-different type barrier rib".

The barrier rib 21 may be also configured so that at least one of the vertical barrier rib 21*a* and the horizontal barrier rib 21*b* has a channel that can be used as an exhaust gas pathway—this is called "channel type barrier rib". The barrier rib 21 may be configured so that at least one of the vertical barrier rib 21*a* and the horizontal barrier rib 21*b* has a hollow—this is called "hollow type barrier rib".

In the height-different type barrier rib, the horizontal barrier rib 21*b* may be higher in height than the vertical barrier rib 21*a*. In the channel type barrier rib or hollow type barrier rib, a channel or hollow may be formed in the horizontal barrier rib 21*b*.

Although red, green, and blue discharge cells are arranged on the same line in this exemplary embodiment of the present invention, they may be arranged in various manners. For example, red, green, and blue discharge cells may be arranged in a shape of the Greek letter "Δ". And, the discharge cell may be shaped as a pentagon, a hexagon, as well as a tetragon.

The phosphor layer 23 may be excited by ultraviolet rays generated upon a gas discharge to emit visible light including red light, green light, and blue light. A mixed inert gas of He+Xe, Ne+Xe, or He+Ne+Xe is injected into a discharge space prepared between the upper/lower substrates 10 and 20 and the barrier rib 21.

Figure 2:
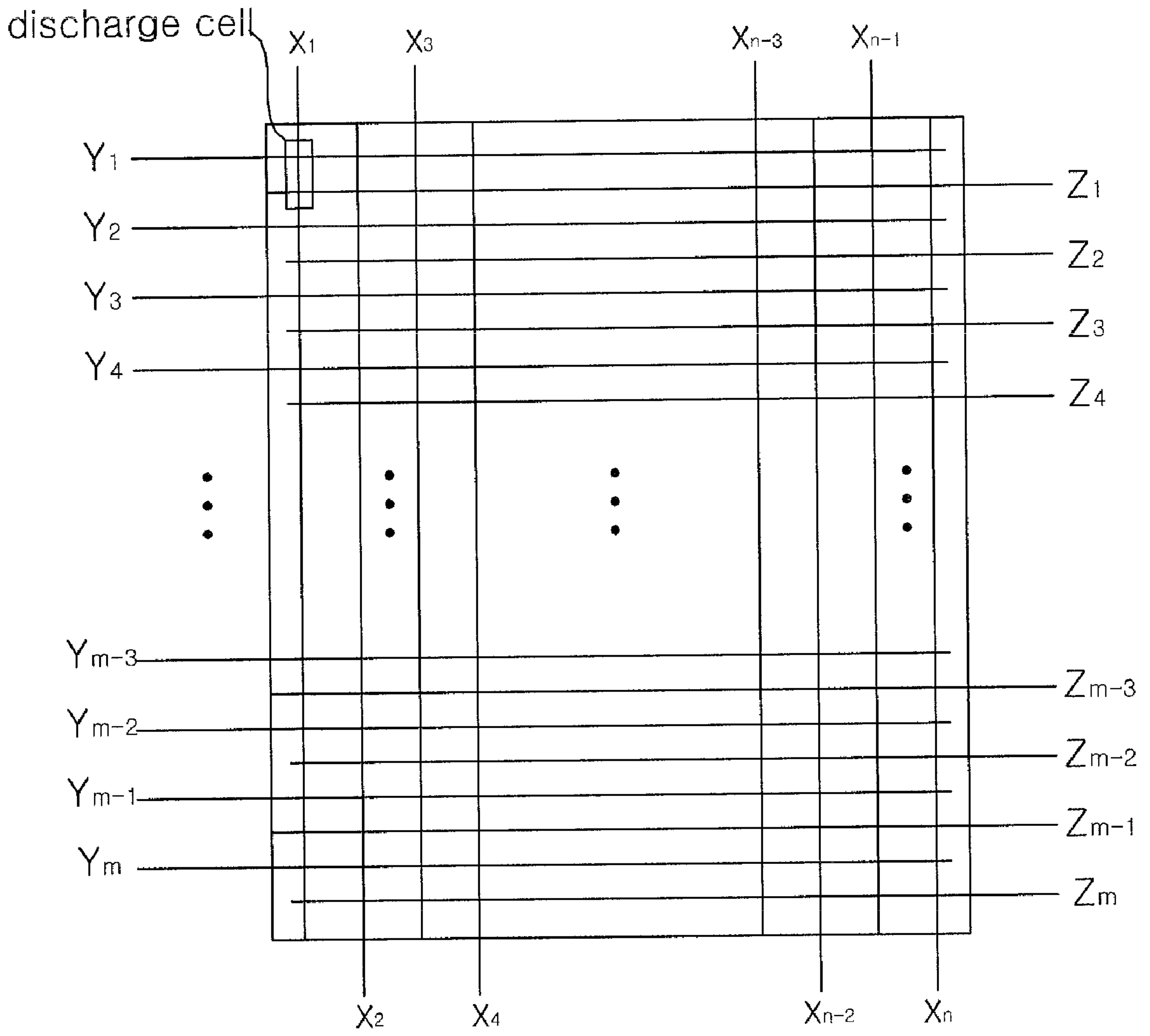
FIG. 2 is a view illustrating an array of electrodes included in a plasma display panel according to an exemplary embodiment of the present invention.

FIG. 2 is a view illustrating an array of electrodes included in a plasma display panel according to an exemplary embodiment of the present invention.

Referring to FIG. 2, plural discharge cells constituting a PDP may be arranged in a matrix pattern. Each of the discharge cells is arranged near an intersection of a scan electrode line Y1 to Ym, a sustain electrode line Z1 to Zm, and an address electrode line X1 to Xn. The scan electrode lines Y1 to Ym may be sequentially or simultaneously driven, and the sustain electrode lines Z1 to Zm may be simultaneously driven. The address electrode lines X1 to Xn may be driven simultaneously or in the order of an odd-numbered line and an even-numbered line.

The electrode arrangement shown in FIG. 2 is only an example of the electrode arrangement in the PDP according to an exemplary embodiment of the present invention. Therefore, the present invention is not limited to the electrode arrangement and driving method shown in FIG. 2. For example, the present invention may employ a dual scan method, where two of the scan electrode lines Y1 to Ym are simultaneously scanned. Also, the address electrode lines X1 to Xn may be divided in left and right parts or in upper and lower parts with respect to a central axis of the panel to be driven according to each of the divided parts.

Figure 3:
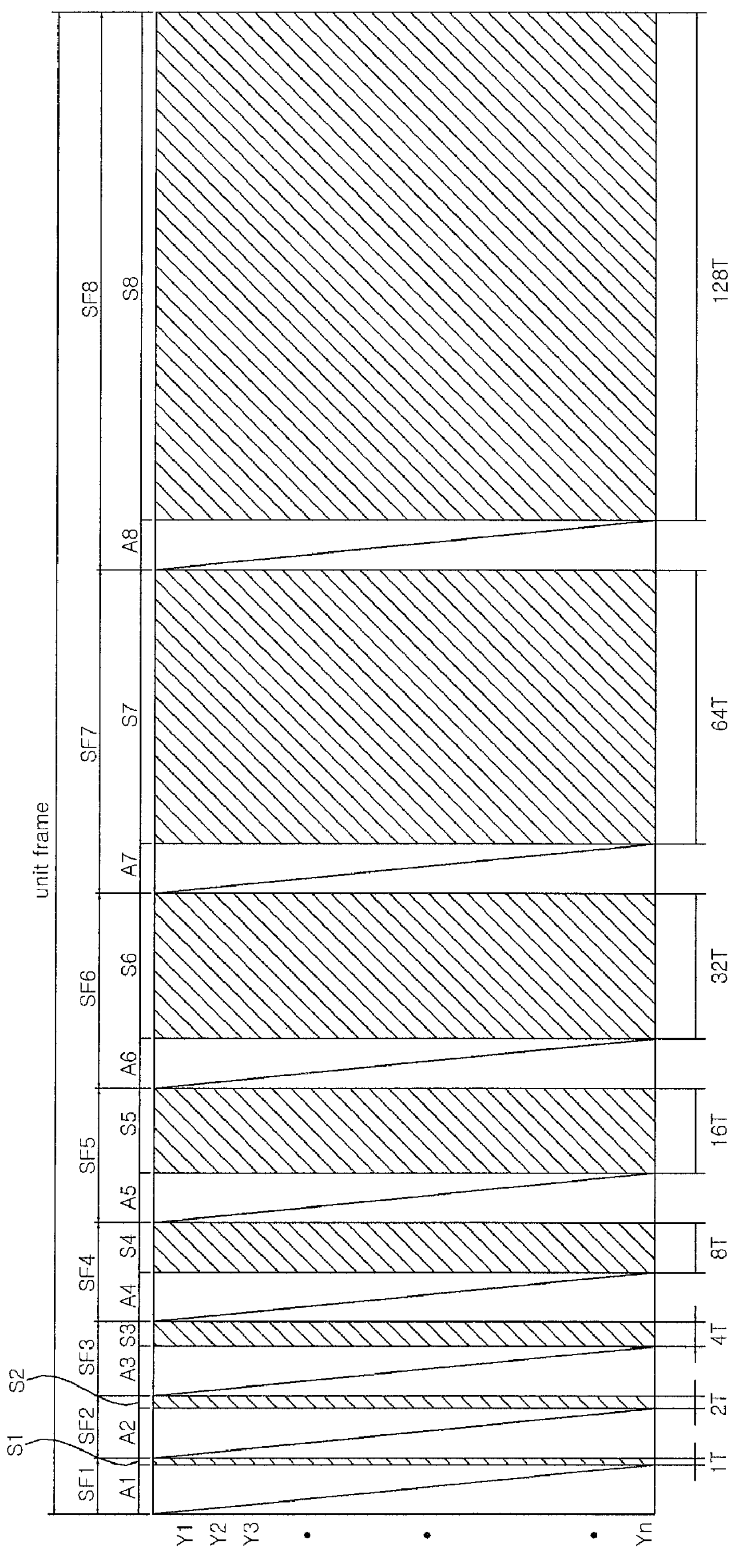
FIG. 3 is a timing diagram illustrating a time-division driving method of a plasma display panel according to an exemplary embodiment of the present invention, wherein one frame is divided into plural sub fields.

FIG. 3 is a timing diagram illustrating a time-division driving method of a plasma display panel according to an exemplary embodiment of the present invention wherein one frame is divided into plural sub fields.

A unit frame may be separated into, e.g. eight sub fields SF1 to SF8 for time-division gray scale display. Each of the sub field SF1 to SF8 includes a reset period (not shown), an address period A1 to A8, and a sustain period S1 to S8.

In accordance with an exemplary embodiment of the present invention, a reset period may be omitted from at least one of the plural subfields. For example, the reset period may exist only within the first sub field, or only within the first sub field and a sub field positioned between the first sub field and the last sub field.

During each address period A1 to A8, a display data signal is applied to the address electrode X and a corresponding scan pulse is sequentially applied to each scan electrode Y.

During each sustain period S1 to S8, a sustain pulse is alternately applied to the scan electrode Y and the sustain electrode Z, so that sustain discharge occurs in the discharge cells in which wall charges are generated during the address period A1 to A8.

The brightness of the PDP is in proportion to the number of sustain discharge pulses generated during the sustain period S1 to S8 occupying a unit frame. In a case where one frame generating one image is represented as eight sub fields and 256 gray scales, the number of sustain pulses may be differently assigned to each sub field in the ratio of 1, 2, 4, 8, 16, 32, 64, and 128. To achieve the brightness of 133 grays scales, it is needed to cause sustain discharge while addressing cells during sub fields SF1, SF3, and SF8.

The number of sustain discharges assigned to each subfield may be determined according to weight value of sub fields according to automatic power control (APC) stage. Although a case has been described in FIG. 3 where one frame is divided into eight subfields, the present invention is not limited thereto, and the number of subfields constituting one frame may be varied depending on design and specifications. For example, one frame may be separated into more than eight subfields, such as 12 subfields and 16 subfields in order to drive the PDP.

Also, the number of sustain discharges assigned to each subfield may be varied considering gamma properties or panel characteristics. For example, the degree of gray scale assigned to subfield SF4 may be lowered from 8 to 6, and the degree of gray scale assigned to subfield 6 may be raised from 32 to 34.

Figure 4:
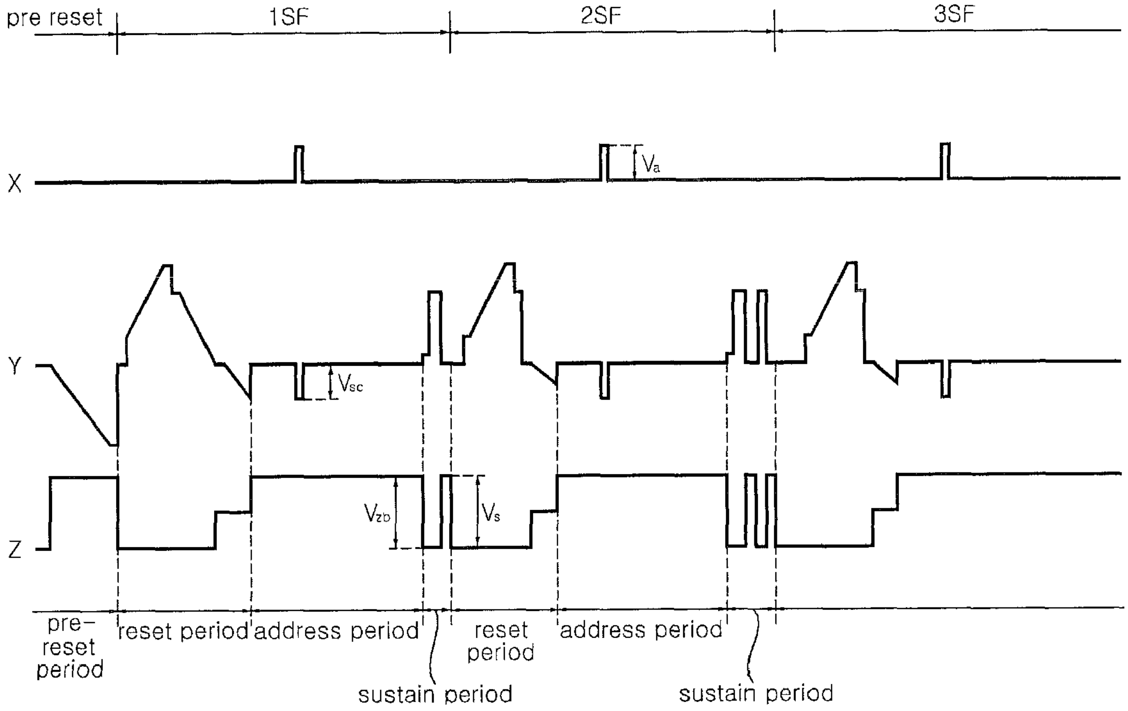
FIG. 4 is a timing diagram illustrating a waveform of a driving signal of driving a plasma display panel according to an exemplary embodiment of the present invention.

FIG. 4 is a timing diagram illustrating a waveform of a driving signal of driving a plasma display panel according to an exemplary embodiment of the present invention.

Referring to FIG. 4, each subfield may include a pre-reset period, a reset-period, an address period, and a sustain period. The pre-reset period generates positive wall charges on the scan electrodes Y and negative wall charges on the sustain electrodes Z. The reset period initializes the overall discharge cells using the distribution of the wall charges formed during the pre-reset period. The address period selects discharge cells. The sustain period sustains discharge occurring in the selected discharge cells.

A reset period includes a set-up period and a set-down period. During the set-up period, a ramp-up waveform is simultaneously applied to the overall scan electrodes to cause tiny discharge in the whole discharge cells, and as a consequence, wall charges are generated. During the set-down period, a ramp-down waveform, which falls from a positive voltage whose peak is lower than that of the ramp-up waveform, is simultaneously applied to the whole scan electrodes Y to cause an erase discharge in the overall discharge cells, and accordingly, unnecessary charges are erased from space charges and wall charges generated by set-up discharge.

During the address period, a scan signal having a negative scan voltage Vsc is sequentially to the scan electrodes, and at the same time, a negative data signal is applied to the address electrode X. Address discharge occurs by the voltage difference between the scan signal and the data signal and wall charges generated during the reset period, and therefore, a cell is selected. In the meanwhile, a sustain bias voltage Vzb may be applied to the sustain electrodes during the address period to raise the efficiency of address discharge.

During the address period, the plural scan electrodes Y may be grouped into two or more, and scan signals may be sequentially applied to the scan electrode groups. And, each scan electrode group may be divided again into two or more sub groups, and scan signals may be sequentially supplied to the sub groups. For example, the plural scan electrodes Y may be divided into a first group and a second group, and scan signals are sequentially supplied to scan electrodes included into the first group and then to scan electrodes included into the second group.

In accordance with an exemplary embodiment of the present invention, the plural scan electrodes Y may be divided into a first group including even-numbered scan electrodes and a second group including odd-numbered scan electrodes. In addition, the plural scan electrodes Y may be divided into a first group including scan electrodes located in an upper part of the panel and a second group including scan electrodes located in a lower part of the panel with respect of a central axis.

The scan electrodes included in the first group may be divided again into a first sub group including even-numbered scan electrodes and a second sub group including odd-numbered scan electrodes, or a first sub group including scan electrodes located in an upper part and a second sub group including scan electrodes located in a lower part with respect to a central line of the first group.

During the sustain period, a sustain pulse having a sustain voltage Vs is alternately applied to the scan electrode and the sustain electrode to cause a sustain discharge in a type of surface discharge between the scan electrode and the sustain electrode.

Out of plural sustain signals alternately supplied to the scan electrode and sustain electrode in the sustain period, the first sustain signal and the last sustain signal may be larger in pulse width than the other sustain signals.

After the sustain discharge, the sub field may further include an erase period to erase wall charges remaining on the scan electrode and the sustain electrode of On-state cells selected during the address period by causing a weak discharge between the scan electrode and the sustain electrode.

The erase period may be included in the overall subfields or some subfields, and an erase signal for causing a weak discharge may be applied to an electrode to which the last sustain pulse is not applied during the sustain period.

The erase signal may include a gradually rising ramp signal, a low voltage wide pulse, a high voltage narrow pulse, an exponential signal, or a half-sinusoidal pulse.

Plural pulses may be sequentially applied to the scan electrode and the sustain electrode to cause a weak discharge.

The driving waveforms shown in FIG. 4 are only an example of signals to drive the plasma display panel according to an exemplary embodiment of the present invention, and the present invention is not limited to the driving waveforms shown in FIG. 4. For example, the pre reset period may be omitted from the sub field, and the polarity and voltage level of the driving waveforms shown in FIG. 4 may be modified as necessary. And, the erase signal may be also applied to the sustain electrode in order to erase wall charges after the sustain discharge has been complete. Furthermore, the sustain signal may be applied to either of the scan electrode Y or the sustain electrode Z to cause a sustain discharge, which is called "single sustain driving".

Figure 5:
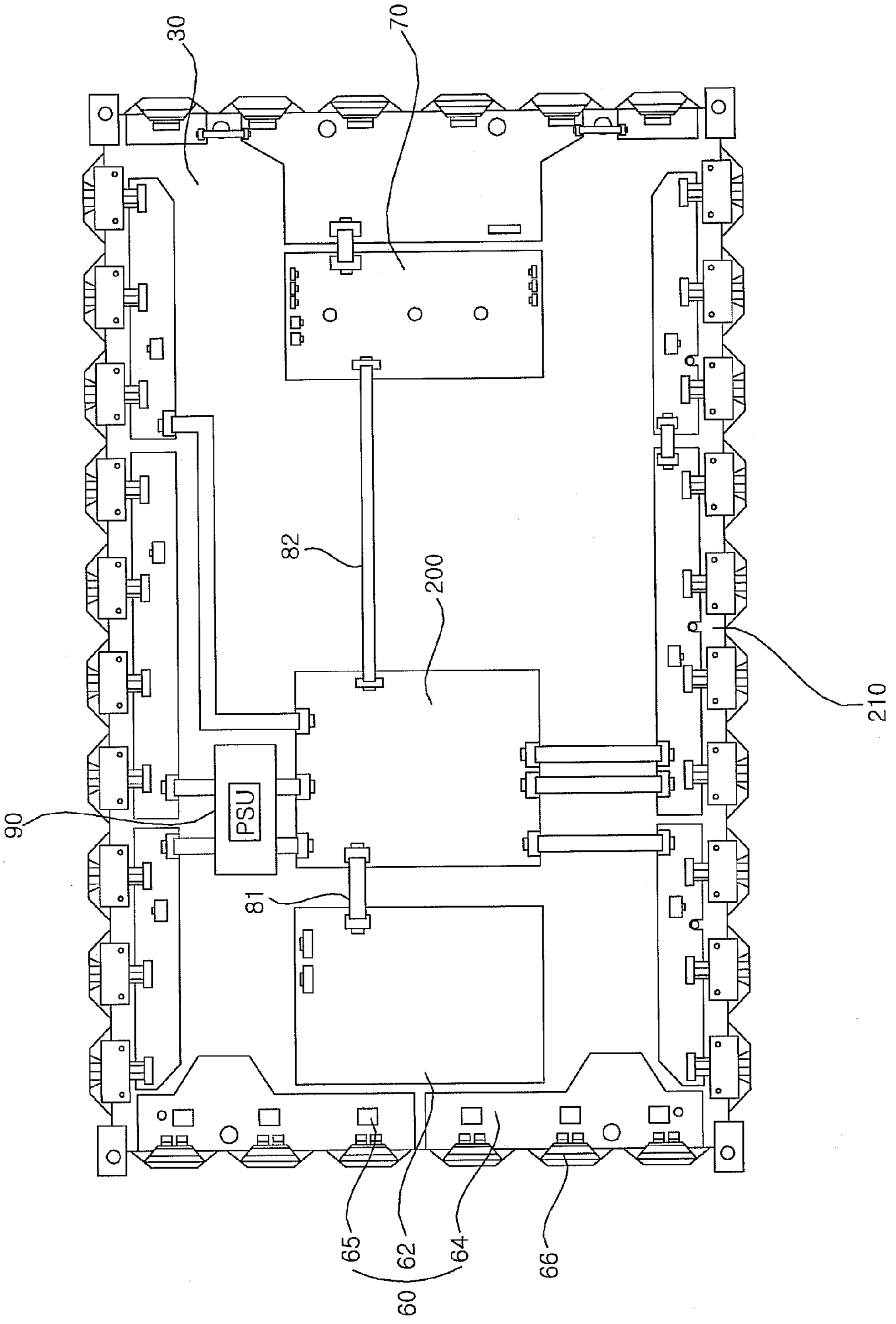
FIG. 5 is a view illustrating a construction of a driving device of driving a plasma display panel according to an exemplary embodiment of the present invention.

FIG. 5 is a view illustrating a construction of a driving device of driving a plasma display panel according to an exemplary embodiment of the present invention.

Referring to FIG. 5, a heat-sink frame 30 is mounted on the rear surface of the panel to support the panel, and absorb and dissipate heat emanating from the panel. A printed circuit board (PCB) is mounted on the rear side of the heat-sink frame 30 to apply driving signals to the panel.

On the printed circuit board may be arranged a data driver 210 for supplying a driving signal to the address electrodes of the panel, a scan driver 60 for supplying a driving signal to the scan electrodes of the panel, a sustain driver 70 for supplying a driving signal to the sustain electrodes of the panel, a controller for controlling the driving circuits, and a power supply unit (PSU) 90 for supplying electricity to each driving circuit.

The data driver 210 supplies a driving signal to the address electrodes arranged on the panel so that only the discharge cells that cause a discharge may be selected out of the plural discharge cells formed on the panel. The data driver 210 may be mounted on either or both of the upper side or/and the lower side of the panel according to a single scan method or dual scan method.

The data driver 210 includes a data IC (Integrated Circuit) to control a current applied to the address electrode. The data IC may cause considerable heat upon switching operations for controlling the current applied to the address electrode. Therefore, the data driver 210 may further include a heat sink (not shown) to dissipate heat generated during the controlling procedure.

As shown in FIG. 5, the scan driver 60 may include a scan sustain board 62 connected to the controller 200 and a scan driver board 64 to connect the panel to the scan sustain board 62.

The scan driver board 64 may be divided into an upper part and a lower part as shown in FIG. 5. The scan driver board 64 may be formed in a single body or divided into more than two parts.

The scan driver board 64 may include a scan IC 65 to supply a driving signal to the scan electrode of the panel. The scan IC 65 may sequentially supply a reset signal, a scan signal, and a sustain signal to the scan electrode.

The sustain driver 70 supplies a driving signal to the sustain electrode of the panel.

The controller 200 performs a signal process on an image signal inputted using signal process information stored at a memory to convert the input image signal into data to be supplied to the address electrodes, and align the converted data according to a scan order. And, the controller 200 may supply a timing control signal to the data driver 210, scan driver 60, and sustain driver 70 to control the point of time supplying the driving signal to the driving circuits.

Figure 6:
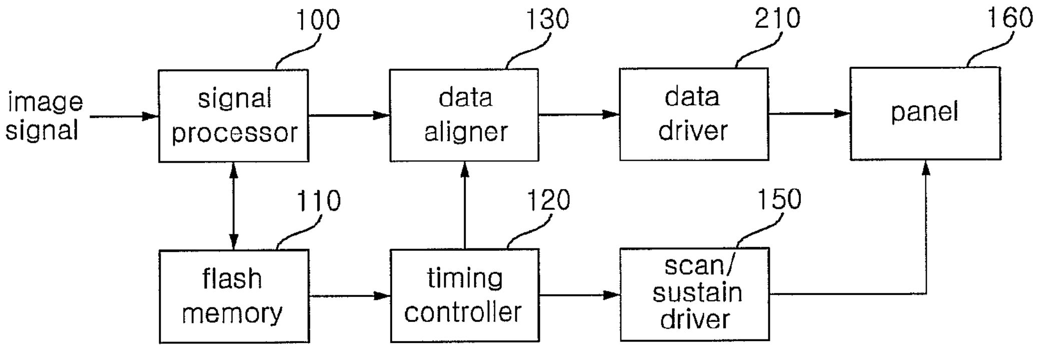
FIG. 6 is a block diagram illustrating a construction of a controller shown in FIG. 7.
Figure 7:
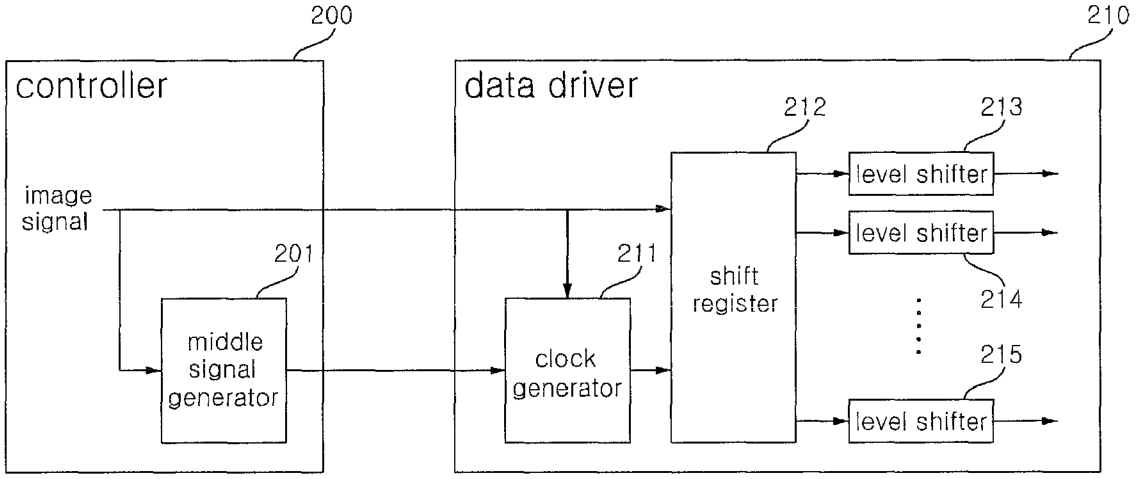
FIG. 7 is a block diagram illustrating a construction of a plasma display panel according to an exemplary embodiment of the present invention.

FIG. 6 is a block diagram illustrating a construction of a controller shown in FIG. 7.

Referring to FIG. 6, the controller 200 may include a signal processor 100, a flash memory 110, a timing controller 120, and a data aligner 130.

The PDP device has a VSC board (not shown) that performs a signal process on an inputted image signal so that the image signal may be displayed on the plasma display panel, and supplies the processed signal to the controller 200. For example, the VSC board (not shown) scales an inputted image signal according to the resolution of the plasma display panel.

The signal processor 100 performs a predetermined signal process on the image signal inputted from the VSC board (not shown) to convert the image signal into data to be displayed. The signal process information for signal processing of the signal processor 100 are stored at the flash memory 110. The flash memory 110 may include EEPROM (Electrically Erasable and Programmable Read Only Memory).

The timing controller 120 receives horizontal/vertical synchronization signals H and V to generate a timing control signal to control the driving period of the panel 160, and outputs the generated timing control signal to the data aligner 130 and scan/sustain driver 150 to control the timing of the driving signals supplied to the panel 160.

The information associated with driving timing necessary to generate the timing control signal by the timing controller 120, for example, the duration of each period during which the panel 160 is separately driven, and the type of each period (type A or type B) are stored at the flash memory 110. The timing controller 120 receives the stored driving timing information from the flash memory 110 and generates the timing control signal using the received driving timing information and the horizontal/vertical synchronization signals H and V.

The data aligner 130 receives the timing control signal generated from the timing controller 120 and the data processed by the signal processor 100 to align the data according to a scan order.

The data driver 210 generates an address electrode driving signal using the aligned data and applies the generated address electrode driving signal to address electrodes (not shown) of the panel 160.

The scan/sustain driver 150 generates a scan electrode driving signal and a sustain electrode driving signal using the timing controller inputted from the timing controller 120 and applies the generated driving signals to scan electrodes (not shown) and sustain electrodes (not shown) of the panel 160.

In the plasma display device according to an exemplary embodiment, the data aligner 130 may generate not only the aligned data signals but also a middle signal having information on whether two or more consecutive data out of the aligned data signals comply with each other, and transmit the generated aligned data signals and the middle signal to the data driver 210.

For example, the middle signal may be adapted to have any variation in signal value only in case that the consecutive data comply with each other, and the middle signal that has only the information on whether the data comply with each other may have less variation in signal value than that of a clock signal.

In a case where the data aligner 130 transmits the aligned data signals and the clock signal to the data driver 210, switches included in the data driver 210 cause a high-rate switching operation by consecutive variation in signal value of the clock signal, and accordingly, power consumption and EMI may increase and margin for panel driving may decrease.

In particular, a high resolution panel such as full HD panel needs to increase the clock frequency as the data to be displayed increase, and this may accelerate the increase of power consumption and EMI and the decrease of driving margin.

Therefore, the PDP device according to an exemplary embodiment of the present invention transmits the middle signal having small variation in signal value than that of the clock signal along with the data signals to reduce the occurrence of EMI and power consumption and ensure sufficient driving margin.

Since a high resolution panel such as a full HD panel or above has scan electrode lines of more than 1080, assuming that one frame is about 16.67 ms, the width of scan signal should be less than 1.1 us to ensure a driving margin of the panel. In case that the width of the scan signal decreases, however, jitter characteristics are lowered, which may increase discharge delay in the address period. In case that the width of scan signal is reduced to less than 0.7 us, considerable discharge delay may take place due to lowering of jitter characteristics, and therefore, it can be possible to identify there is a wrong address discharge.

Accordingly, such a high resolution panel such as full HD panel should have the width of scan signal of about 0.7 us to about 0.11 us to prevent mal-address discharge as well as ensure a panel driving margin. FIG. 7 is a block diagram illustrating a construction of a plasma display panel according to an exemplary embodiment of the present invention.

Referring to FIG. 7, the controller 200 may include a middle signal generator 201 that generates a middle signal according to a data signal to be transmitted to the data driver 210. The middle signal has information on whether two or more consecutive data comply with each other out of the data signals, and the controller 200 transmits the middle signal to the data driver 210 along with the data signal.

The data signal may be a differential signal. For example, the controller 200 may convert a data signal with TTL level (5V) into a low voltage differential signal with a level of 0.9V to 1.9V, for example 1.5V, and then serially transmit the converted low voltage differential signal. Such converting into low voltage signal and transmitting may reduce noise and power consumption during transmission and such transmitting of the differential signal may reduce influence from common mode noise and EMI.

In this case, the data driver 210 receives serially transmitted low voltage differential signal and converts the received low voltage differential signal back into the signal with TTL level (5V).

The middle signal generator 201 compares two or more consecutive data out of the data signals to each other to determine if the two or more consecutive data comply with each other, and generates a middle signal having a signal value varying depending on whether the two or more consecutive data comply with each other.

Figures 8, 9:
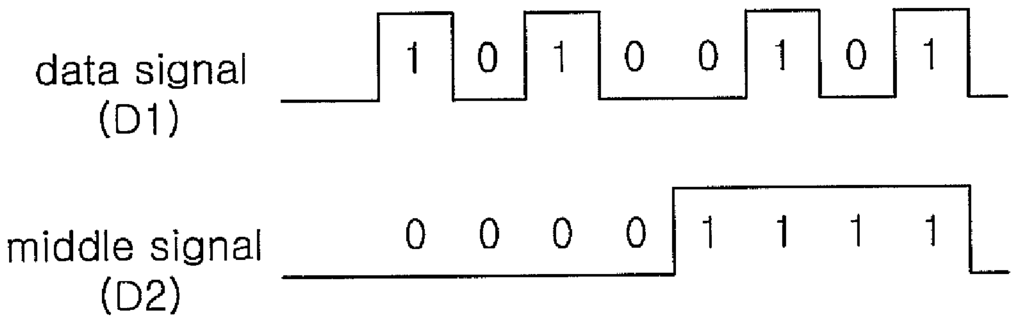
FIG. 8 and FIG. 9 are views illustrating a method of generating a middle signal having information on whether two or more consecutive data comply with one another according to an exemplary embodiment of the present invention.

FIG. 8 and FIG. 9 are views illustrating a method of generating a middle signal having information on whether two or more consecutive data comply with one another according to an exemplary embodiment of the present invention.

Referring to FIG. 8, in case that current data of a data signal is equal to previous data, the middle signal generator 201 changes the value of the middle signal. That is, in case that the current data is equal to the previous data and the value of the middle signal corresponding to the previous data is '0', the value of the middle signal corresponding to the current data becomes '1'.

In case that current data of a data signal is different from previous data, the middle signal generator 201 maintains the value of the middle signal. That is, in case that the current data is different from the previous data and the value of the middle signal corresponding to the previous data is '0', the value of the middle signal corresponding to the current data becomes '0'.

Referring to FIG. 9, the first middle signal value is initialized as '0', and if the data of a data signal changes from 1 to 0, the middle signal value maintains 0 and therefore the second middle signal value becomes 0. Then, while the data of the data signal changes continuously, the middle signal value maintains 0. As the fourth data and fifth data of the data signal maintain 0, the middle signal value changes from 0 to 1. Then while the data of the data signal changes continuously, the middle signal value maintains 1.

As shown in FIG. 9, it can be seen that the middle signal, which is generated to have information on whether consecutive data out of data signals comply with each other, has very tiny change in signal value compared to the clock signal.

Although a case has been described above where the middle signal generator 201 determines the current middle signal value depending on whether the current data complies with the previous data and the previous middle signal value, the present invention is not limited thereto. For example, the middle signal generator 201 may determine the current middle signal value and generate the middle signal using three or more consecutive data and two or more previous middle signal values.

The controller 200 transmits the middle signal generated in the above method along with the data signal to the data driver 210. The data driver 210 may include a clock generator 211 generating a clock signal using the data signal and middle signal transmitted from the controller 200. The clock generator 211 may generate a clock signal using the information on whether the consecutive data of the data signal included in the data signal and the middle signal comply with each other. A method of generating a clock signal by a clock generator 211 will be described with reference to FIG. 10.

Figure 10:
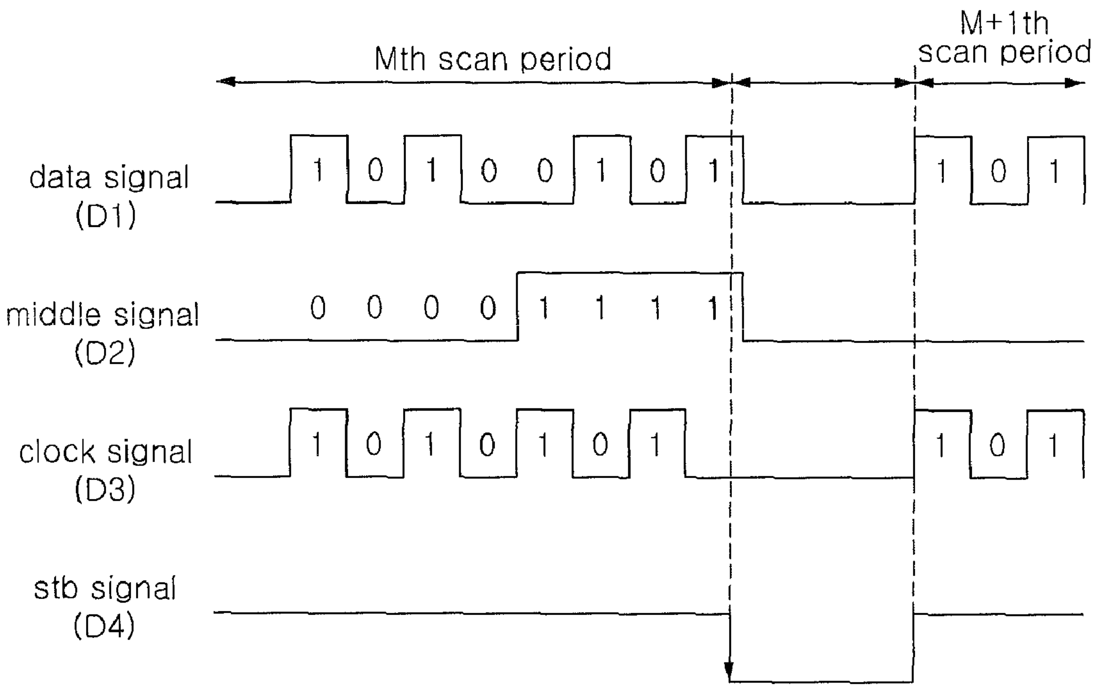
FIG. 10 is a view illustrating a method of generating a clock signal using a data signal and a middle signal.

The clock generator 211 may generate a clock signal from a data signal and a middle signal using a reverse-operation of an operation for generating a middle signal shown in FIG. 8. That is, the clock generator 211 is adapted so that the clock signal value is a high level value, i.e. 1 in case that the data of the data signal is different from the middle signal value, and a low level value, i.e. 0 in case that the data of the data signal is equal to the middle signal value. Therefore, the clock generator 211 may generate a clock signal that varies continuously according to a predetermined frequency as shown in FIG. 10.

A shift register 212 extracts data to be supplied to each address electrode out of inputted data signals using the clock signal generated in the clock generator 212 and outputs the extracted data.

The shift register 212 shifts all bits of the data signal to their next bits in accordance with the period of the generated clock signal, and therefore, a new bit of the data signal enters into an end of the bit stream and the previous last bit is out of the bit stream.

By doing so, the shift register 212 outputs data to be supplied to each of the plural address electrodes, and the data are converted in voltage level by plural level shifters 213, 214, and 215 and then supplied to each of the plural address electrodes.

Hereinafter, a method of supplying data signal to the address electrodes of the panel will be described in more detail with reference to FIG. 10.

FIG. 10 is a view illustrating a method of generating a clock signal using a data signal and a middle signal.

The controller 200 may transmit a control signal such as a strobe signal STB and a blanking signal BLK to the data driver 210 along with the data signal.

The strobe signal STB is a signal to control the data output of the shift register 212. For example, in case that the strobe signal (STB) value is 1, the shift register 212 outputs data in accordance with the generated clock, and in case that the strobe signal (STB) value is 0, the shift register 212 maintains the data not to be outputted.

In addition, the clock generator 211 generates a clock signal using the data signal and the middle signal while the strobe signal (STB) value is maintained as 1, and outputs the generated clock signal to the shift register 212, and if the strobe signal (STB) value changes into 0, the clock generator 211 initializes the data signal and the middle signal as 0 and stops generating and outputting the clock signal.

Referring to FIG. 10, during the Mth scan period where the data signal is supplied to the plural address electrodes, the strobe signal (STB) value is 1 and therefore data corresponding to each address electrode is outputted from the shift register 212 according to the clock signal generated by the clock generator 211.

If the Mth scan period terminates, the strobe signal (STB) value changes into 0, the data signal value and the middle signal value are initialized as 0 and the clock generator 211 and the shift register 212 stop their operations.

While the strobe signal (STB) value is 0 after the Mth scan period has been terminated, the reset period or address period may exist as described above with reference to FIG. 4.

When the M+1th scan period starts, the strobe signal (STB) value changes back to 1, and the clock generator 211 generates a clock signal and the shift register 212 outputs data according to the generated clock signal.

The flat panel display device according to exemplary embodiments of the present invention may reduce power consumption or EMI occurring due to high-rate switching operations and ensure a sufficient driving margin of a panel by transmitting a middle signal, variation in signal value of which is smaller than that of a clock signal, to the data driver along with a data signal.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A flat panel display device comprising:

a flat panel display panel;

a controller to process an input image signal and generate a data signal to be supplied to the panel, the controller to generate a first signal having information on whether two or more consecutive data of the data signal comply with each other, and to output the first signal along with the data signal; and a data driver to generate a clock signal using the data signal and the first signal received from the controller and to supply the data signal to the panel using the generated clock signal, wherein a value of the first signal corresponding to Nth data of the data signal is determined based on whether N−1th data of the data signal complies with the Nth data of the data signal;

wherein the value of the first signal corresponding to the Nth data is determined based on the N−1th data, the Nth data, and the value of the first signal corresponding to the N−1th data;

when the N−1th data is different from the Nth data, the value of the first signal corresponding to the Nth data is equal to the value of the first signal corresponding to the N−1th data;

when the N−1th data is the same as the Nth data, the value of the first signal corresponding to the Nth data is different from the value of the first signal corresponding to the N−1th data.

2. The flat panel display device of claim 1, wherein the data signal is a differential signal.

3. The flat panel display device of claim 1, wherein the value of the generated clock signal has a first level when the data of the data signal is equal to the value of the first signal, and has a second level different from the first level when the data of the data signal is different from the value of the first signal.

4. The flat panel display device of claim 1, wherein the value of the generated clock signal has a low level when the data of the data signal is equal to the value of the first signal, and has a high level when the data of the data signal is different from the value of the first signal.

5. The flat panel display device of claim 1, wherein the data driver generates the clock signal only when a second signal inputted from the controller is a high level.

6. The flat panel display device of claim 5, wherein the data driver initializes the data of the data signal and the value of the first signal as a low level when the value of the second signal is a low level.

7. A plasma display panel device comprising:

a plasma display panel having an upper substrate and a lower substrate, the upper substrate formed with a scan electrode and a sustain electrode, the lower substrate formed with an address electrode;

a controller processing to process an inputted image signal and generate a data signal to be supplied to the plasma display panel, the controller to generate a first signal having information on whether two or more consecutive data of the data signal comply with each other and to output the first signal along with the data signal; and a data driver to supply a driving signal to the address electrode based on the data signal and the first signal received from the controller, wherein the data driver includes:

a clock generator to generate a clock signal based on the data signal and the first signal, and a data IC to supply the driving signal generated using the clock signal to the address electrodes wherein a value of the first signal corresponding to Nth data of the data signal is determined based on whether N−1th data of the data signal complies with the Nth data of the data signal;

when the N−1th data is different from the Nth data, the value of the first signal corresponding to the Nth data is equal to the value of the first signal corresponding to the N−1th data;

when the N−1th data is the same as the Nth data, the value of the first signal corresponding to the Nth data is different from the value of the first signal corresponding to the N−1th data.

8. The plasma display panel device of claim 7, wherein the data signal is a differential signal.

9. The plasma display panel device of claim 7, wherein the clock generator generates the clock signal so that the value of the generated clock signal has a first level when the data of the data signal is equal to the value of the first signal, and has a second level different from the first level when the data of the data signal is different from the value of the first signal.

10. The plasma display panel device of claim 7, wherein the clock generator operates when the value of a second signal received from the controller is a high level.

11. A flat panel display device comprising:

a flat panel display panel;

a controller to process an inputted image signal and generate a data signal that is a differential signal, the controller to generate a first signal having information on whether two or more consecutive data of the data signal comply with each other and to output the first signal along with the data signal; and a data driver to supply a driving signal to the panel based on the data signal and the first signal received from the controller, wherein the data driver includes:

a clock generator to generate a clock signal based on the data signal and the first signal, and a data IC to supply the driving signal generated using the clock signal to the address electrodes, wherein a value of the first signal corresponding to Nth data of the data signal is determined based on whether N−1th data of the data signal complies with the Nth data of the data signal;

when the N−1th data is different from the Nth data, the value of the first signal corresponding to the Nth data is equal to the value of the first signal corresponding to the N−1th data;

when the N−1th data is the same as the Nth data, the value of the first signal corresponding to the Nth data is different from the value of the first signal corresponding to the N−1th data.

12. The flat panel display device of claim 11, wherein the data signal has a level of about 0.9V to about 1.9V.

13. The flat panel display device of claim 11, wherein the clock generator generates the clock signal so that the value of the generated clock signal has a first level when the data of the data signal is equal to the value of the first signal, and has a second level different from the first level when the data of the data signal is different from the value of the first signal.

* * * * *